(12) United States Patent
Kawanishi et al.

(10) Patent No.: US 12,535,159 B2
(45) Date of Patent: Jan. 27, 2026

(54) PIPE DETACHMENT PREVENTING DEVICE FOR UNION NUT PIPE FITTING

(71) Applicant: SK-KAWANISHI CO., LTD., Kagawa (JP)

(72) Inventors: Hidehito Kawanishi, Kagawa (JP); Akira Tsurumi, Kagawa (JP)

(73) Assignee: SK-KAWANISHI CO., LTD., Kagawa (JP)

(*) Notice: Subject to any disclaimer, the term of this patent is extended or adjusted under 35 U.S.C. 154(b) by 60 days.

(21) Appl. No.: 18/566,050

(22) PCT Filed: Dec. 24, 2021

(86) PCT No.: PCT/JP2021/048258
§ 371 (c)(1),
(2) Date: Nov. 30, 2023

(87) PCT Pub. No.: WO2022/259583
PCT Pub. Date: Dec. 15, 2022

(65) Prior Publication Data
US 2024/0247740 A1     Jul. 25, 2024

(30) Foreign Application Priority Data

Jun. 7, 2021   (JP) ................................. 2021-095479

(51) Int. Cl.
*F16L 19/00*     (2006.01)
(52) U.S. Cl.
CPC .................. *F16L 19/005* (2013.01)
(58) Field of Classification Search
CPC .................................................. F16L 19/005
See application file for complete search history.

(56) References Cited

U.S. PATENT DOCUMENTS

| 4,966,395 A | 10/1990 | Hendrickson |
| 5,490,693 A * | 2/1996 | Fisher .................. F16L 19/005 |

(Continued)

FOREIGN PATENT DOCUMENTS

| JP | S58-005585 A | 1/1983 |
| JP | 2007-537414 A | 12/2007 |

(Continued)

OTHER PUBLICATIONS

International Search Report Issued in Application No. PCT/JP2021/048258, dated Mar. 22, 2022.

*Primary Examiner* — Zachary T Dragicevich
(74) *Attorney, Agent, or Firm* — Michael Best & Friedrich LLP

(57) ABSTRACT

A pipe detachment preventing device for a union nut pipe fitting. A protruding portion has at least a flange portion 75 having a through hole 76, and a wall portion 77 extending from the flange portion 75. An end portion 77 *a* of the wall portion 77 opposed to another divisional component is formed so as to protrude toward the other divisional component relative to an end portion 73 *a* of an arm 73 and a hook 72 opposed to the other divisional component. A retaining ring 7 has a compressively-deformable held member 8 and which is held between the flange portions 75 opposed to each other. The compressively-deformable held member 8 forms a gap S between the end portions 77 *a* of the wall portions 77 when a pair of divisional components are coupled and latched to a union nut 4 in a loose-fit state.

7 Claims, 12 Drawing Sheets

(56) References Cited

U.S. PATENT DOCUMENTS

| | | | |
|---|---|---|---|
| 2012/0175869 A1* | 7/2012 | Artini | F16L 19/005 |
| 2014/0353960 A1* | 12/2014 | Alexander | F16L 19/005 |
| 2019/0086006 A1 | 3/2019 | Nam | |

FOREIGN PATENT DOCUMENTS

| | | | | |
|---|---|---|---|---|
| JP | 2013-204736 A | 10/2013 | | |
| JP | 2015-158273 A | 9/2015 | | |
| KR | 20170142052 A | * 12/2017 | | F16L 19/005 |

* cited by examiner

PIPE DETACHMENT PREVENTING DEVICE FOR UNION NUT PIPE FITTING

RELATED APPLICATIONS

This application is a national phase application of International Application No. PCT/JP2021/048258, filed Dec. 24, 2021, which claims priority to Japanese Application No. 2021-095479, filed on Jun. 7, 2021, the entire contents of which are incorporated by reference.

TECHNICAL FIELD

The present invention relates to a pipe detachment preventing device for a union nut pipe fitting. More specifically, the present invention relates to a pipe detachment preventing device for a union nut pipe fitting, including: a fitting body having a receiving portion which has an external thread on an outer surface thereof and into which a non-threaded pipe is inserted: a union nut which is screwed and tightened to the receiving portion with an annular rubber packing interposed therebetween: and a retaining ring composed of a pair of divisional components fixed to an outer-peripheral surface of the pipe by tightening means so as to be opposed to each other, each divisional component having a body portion along the outer-peripheral surface, an arm which is along an axial direction of the pipe and is provided with, at a distal end, a hook to be latched to the union nut, and a protruding portion provided with the arm and protruding outward from an end portion of the body portion.

BACKGROUND ART

Conventionally, as a pipe detachment preventing device for a union nut pipe fitting as described above, for example, a device described in Patent Document 1 has been known. In this device, for forming a gap between abutting surfaces of flange portions of divisional components opposed to each other, an abutting surface of a hook portion of one divisional component protrudes toward the other divisional component relative to the abutting surface of the flange portion of the one divisional component. Therefore, tightening of a retaining ring is performed with the hook portion as a base point, and the tightening state needs to be managed using a torque meter or the like. In addition, if the pipe detachment preventing device in a temporarily-assembled state is transported (shipped), bolts and nuts might come off due to vibration or the like during transportation.

CITATION LIST

Patent Documents

[PATENT DOCUMENT 1] Japanese Laid-Open Patent Publication No. 2013-204736

SUMMARY OF THE INVENTION

Problems to be Solved by the Invention

Considering the above conventional circumstances, an object of the present invention is to provide a pipe detachment preventing device for a union nut pipe fitting that can keep a temporarily-assembled state and enables tightening work to be performed uniformly, while having a simple structure.

Solution to the Problems

To achieve the above object, a pipe detachment preventing device for a union nut pipe fitting according to the present invention includes: a fitting body having a receiving portion which has an external thread on an outer surface thereof and into which a non-threaded pipe is inserted: a union nut which is screwed and tightened to the receiving portion with an annular rubber packing interposed therebetween: and a retaining ring composed of a pair of divisional components fixed to an outer-peripheral surface of the pipe by tightening means so as to be opposed to each other. Each divisional component includes a body portion along the outer-peripheral surface, an arm which is along an axial direction of the pipe and is provided with, at a distal end, a hook to be latched to the union nut, and a protruding portion provided with the arm and protruding outward from an end portion of the body portion. The protruding portion has at least a flange portion having a through hole through which the tightening means penetrates, and a wall portion extending from the flange portion. The wall portion is provided only at a side part along the axial direction of the flange. An end portion of the wall portion opposed to another divisional component is formed so as to protrude toward the other divisional component relative to end portions of the arm and the hook opposed to the other divisional component. When the end portions of the wall portions are brought into contact with each other, the end portions of the arms and the hooks do not contact with each other. The retaining ring has an elastically-deformable rubber member through which the tightening means is inserted and which is held between the flange portions opposed to each other. The rubber member forms a gap between the end portions of the wall portions when the pair of divisional components are coupled by the tightening means and latched to the union nut in a loose-fit state. The tightening means is tightened until the end portions of the wall portions are brought into contact with each other and the gap disappears, thus causing a part of the rubber member to protrude out in the axial direction from the flange portion and tightening and fixing the pair of divisional components to the outer-peripheral surface of the pipe.

According to the above configuration, the protruding portion has at least the flange portion having the through hole through which the tightening means penetrates, and the wall portion extending from the flange portion. The end portion of the wall portion opposed to another divisional component is formed so as to protrude toward the other divisional component relative to the end portions of the arm and the hook opposed to the other divisional component. The retaining ring has the compressively-deformable held member through which the tightening means is inserted and which is held between the flange portions opposed to each other. Thus, when the pair of divisional components are coupled by the tightening means and latched to the union nut in a loose-fit state, the gap is formed by the compressively-deformable held member, between the end portions of the wall portions. Therefore, at the time of inserting the pipe into the fitting body, a worker need not hold the divisional components by a hand so as to prevent them from coming close to each other, and thus workability significantly improves. Moreover, interposing the held member can also prevent a phenomenon in which the tightening means is loosened and coupling (loose-fit state) between the pair of divisional components is released. Further, since the held member is compressively deformable, the tightening means only has to be tightened until the end portions of the wall portions come into contact with each other. Thus, completion of tightening work can be easily confirmed and variations in the tightening amount among workers can be reduced.

Moreover, the wall portion is provided only at a side part along the axial direction of the flange. When the tightening means is tightened until the end portions of the wall portions come into contact with each other, compressive deformation of the compressively-deformable held member is led (released) in two directions toward both sides (front and rear sides) in the axial direction of the flange portions where members corresponding to the wall portions are not provided. Thus, tightening torque does not become excessive and workability is not lowered. In addition, the held member is an elastically-deformable rubber member. Since the rubber member is slightly compressed by the flange portions coupled by the tightening means, the pair of divisional components opposed to each other are subjected to reaction forces so as to be separated from each other, so that the divisional components do not come close to each other and the interval therebetween is ensured (kept). Therefore, at the time of inserting the pipe into the fitting body, a worker need not hold the divisional components by a hand so as to prevent them from coming close to each other, and thus workability significantly improves.

In addition, a height of the hook from a top surface of the flange portion may be greater than a thickness of the flange portion. In a state before the pipe is inserted (temporarily-assembled state), for example, the pair of divisional components coupled by the tightening means might be positioned (latched) so as to be shifted downward relative to the union nut by gravity. If the height of the hook from the top surface of the flange portion is greater than the thickness of the flange portion, the distal end of each hook of the divisional components interferes (contacts) with the union nut, whereby the retaining ring is prevented from coming off. In such a case, a height of the arm from the top surface of the flange portion is equal to or smaller than the height of the hook from the flange portion.

In such a case, the end portion of the body portion of each divisional component may protrude from the flange portion, the rubber member may have a body portion with a substantially rectangular shape, and a protruding portion which protrudes toward a pipe-axis side from a side surface of the body portion located on the pipe-axis side, and the protruding portion may be held between the end portions of the body portions of the divisional components opposed to each other. Further, the body portion of the rubber member may be held between the wall portion and a part protruding from the flange portion of the body portion of each divisional component. Thus, the posture of the rubber member can be stably kept between the flange portions opposed to each other, whereby temporary assembling of the pipe detachment preventing device is facilitated and workability improves.

In addition, the rubber member desirably has a through hole through which the tightening means penetrates and which has a circular shape in a plan view: If the through hole has a circular shape in a plan view: the compressively-deformable held member does not come off the tightening means when being compressively deformed, and workability is not lowered.

In any of the above configurations, the pipe may be an inner-surface-lined steel pipe or an inner-and-outer-surface-lined steel pipe, and on an inner surface of the body portion, a tooth may be formed near the protruding portion. In addition, the pipe may be a plastic pipe, and on an inner surface of the body portion, a plurality of teeth may be formed along a circumferential direction of the pipe. Examples of the plastic pipe include polyethylene pipe and polyvinyl chloride pipe.

Advantageous Effects of the Invention

The above configuration of the pipe detachment preventing device for a union nut pipe fitting according to the present invention can keep a temporarily-assembled state and enables tightening work to be performed uniformly, while having a simple structure.

Other objects, configurations, and effects of the present invention will become apparent from the description of embodiments of the present invention shown below.

DESCRIPTION OF EMBODIMENTS

Next, with reference to FIGS. 1 to 12 as necessary, a first embodiment of the present invention will be described more specifically.

Figure 1:
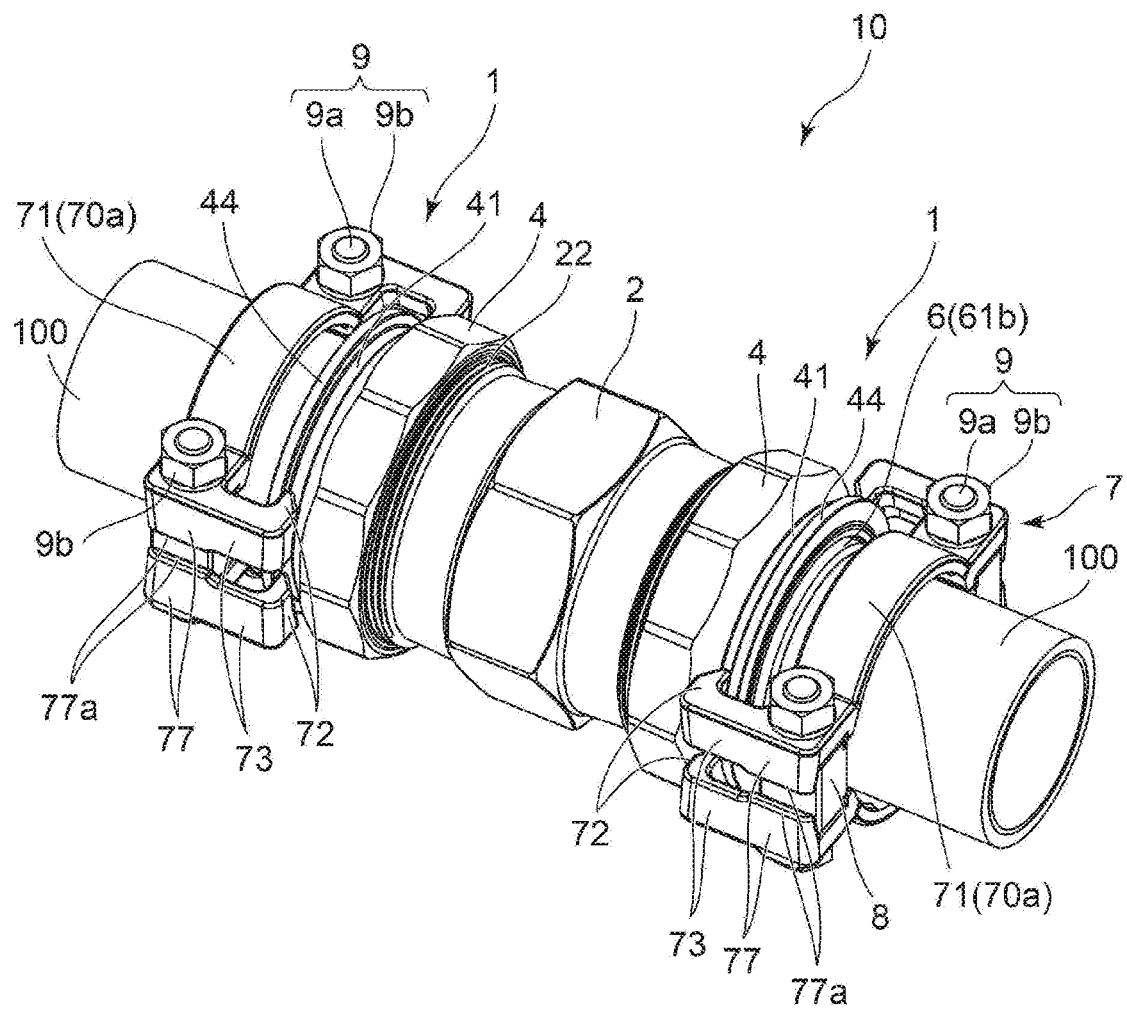
FIG. 1 is a perspective view showing a pipe detachment preventing device for a pipe fitting according to the present invention.
Figure 2:
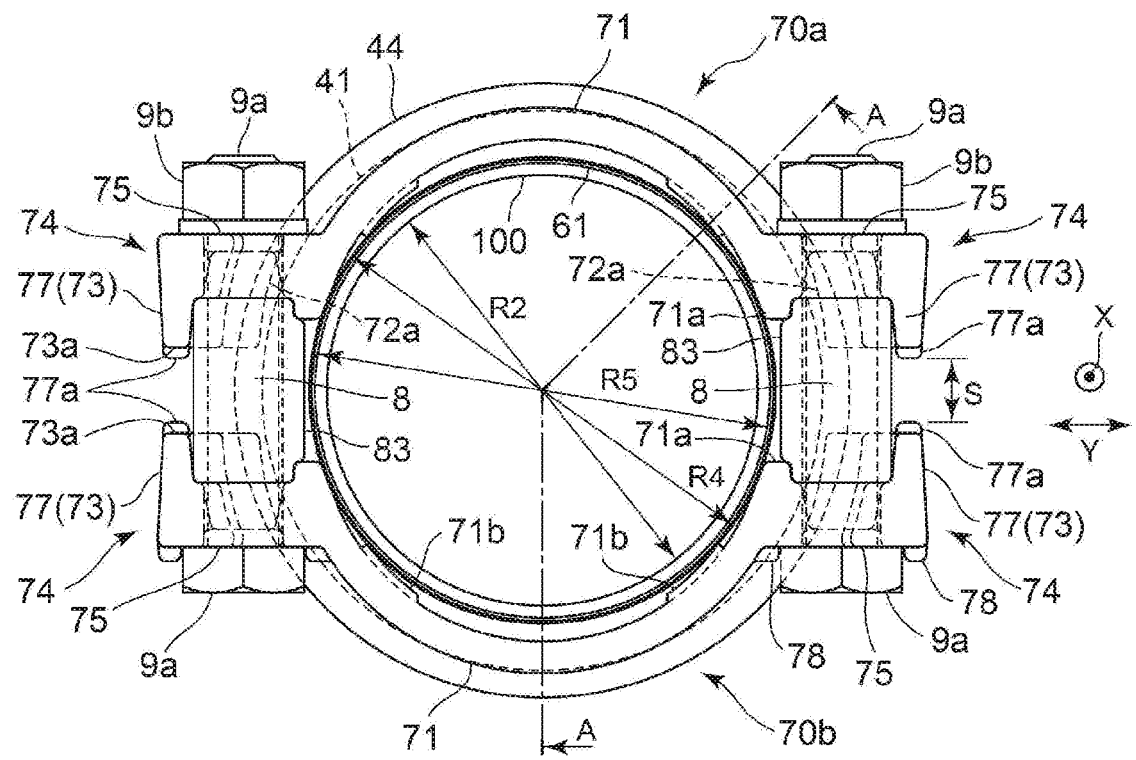
FIG. 2 is a view showing a state before a retaining ring is tightened, as seen in a pipe-axis direction.
Figure 3:
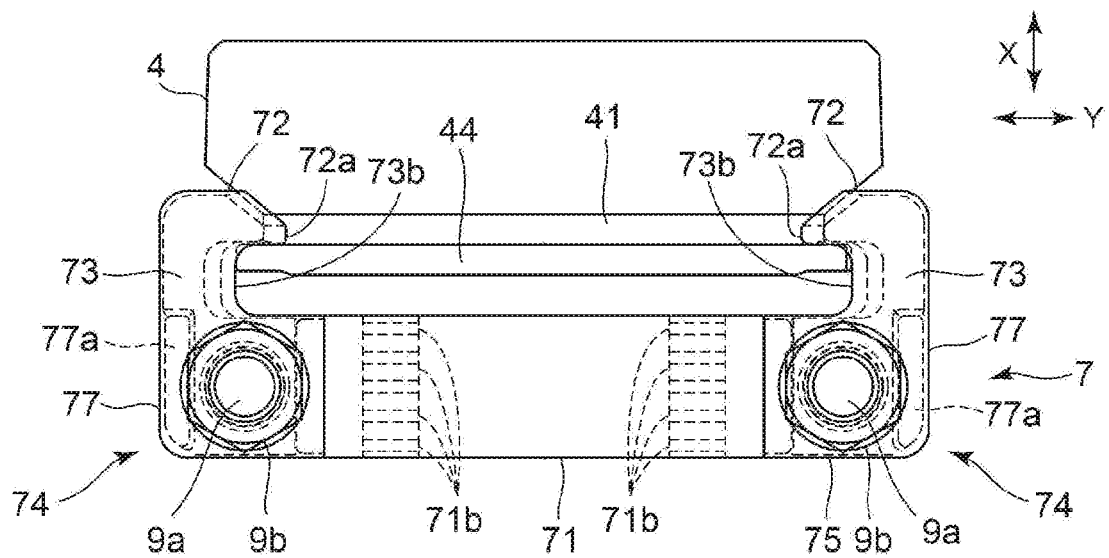
FIG. 3 is a plan view of FIG. 2.
Figure 5:
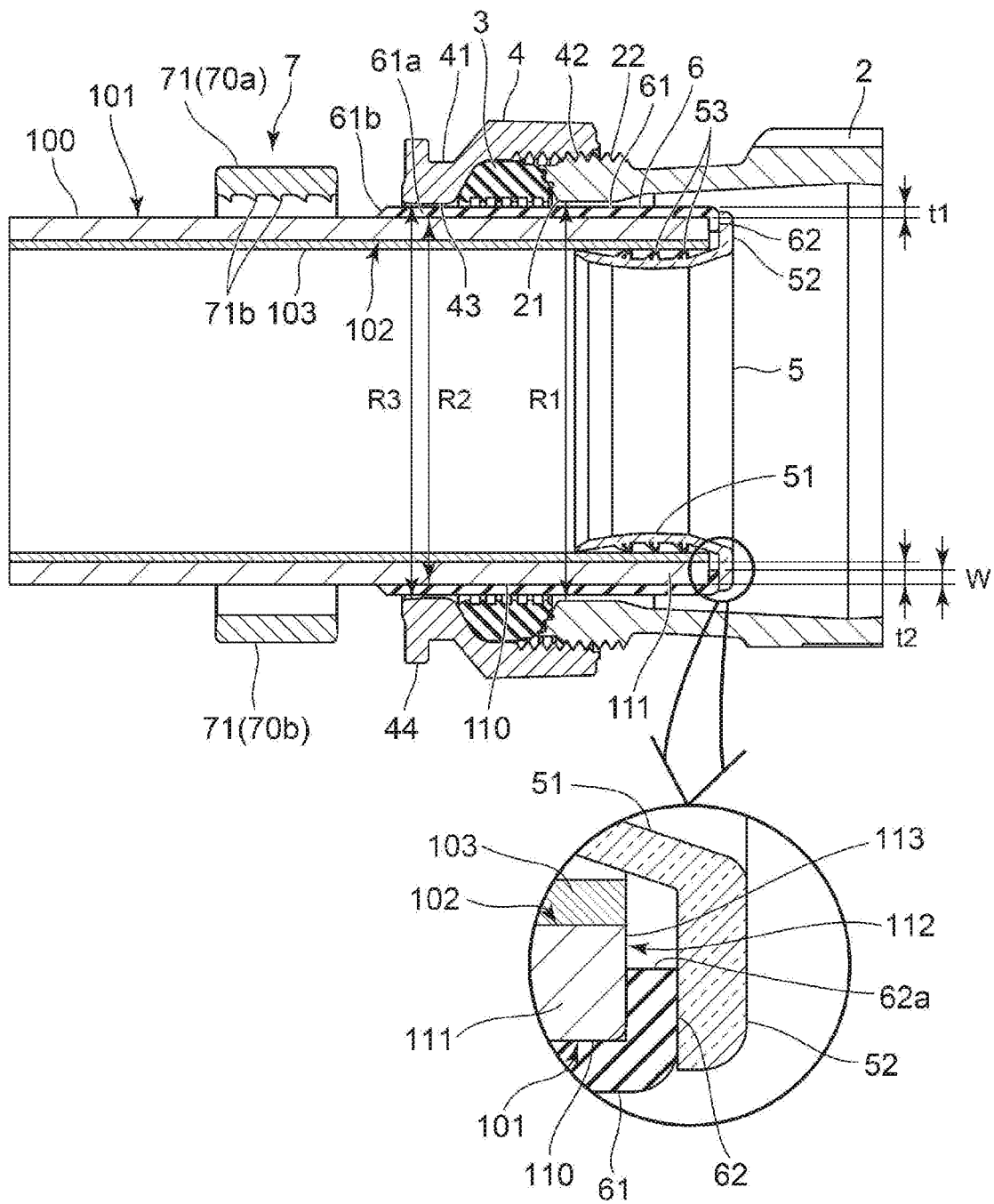
FIG. 5 is an A-A sectional view of FIG. 2.

As shown in FIGS. 1 and 5, a pipe detachment preventing device 1 for a union nut pipe fitting 10 according to the present invention roughly includes a fitting body 2 into which a non-threaded pipe 100 is inserted, a union nut 4 screwed and tightened to a receiving portion 21 with an annular rubber packing 3 interposed therebetween, and a retaining ring 7 composed of a pair of first and second divisional components 70a, 70b fixed to an outer-peripheral surface 101 of a pipe 100 by tightening means 9) so as to be opposed to each other.

In the present embodiment, as shown in FIG. 5, the pipe 100 is an inner-surface-lined steel pipe with a lining 103 coating an inner-peripheral surface 102 of the pipe 100, and the outer-peripheral surface 101 is not coated with a lining. Examples of the material of the lining 103 include rigid polyvinyl chloride and polyethylene. When the pipe 100 is cut, a metal pipe body 111 is exposed at the cut surface (pipe-end surface 112), and corrosion progresses from an exposed portion 113 of the pipe-end surface 112 and the outer-peripheral surface 101 which are exposed metal parts. Accordingly, in the present embodiment, a corrosion-prevention core 5 and a rubber cover 6 are attached to a pipe-end portion 110, so as to cover the outer-peripheral surface 101 and the pipe-end surface 112 inside the fitting body 2, thereby preventing corrosion of the pipe-end portion 110.

As shown in FIGS. 1 and 5, the fitting body 2 has the tapered receiving portion 21 and an external thread 22 formed on an outer-peripheral surface thereof. An inner diameter R1 of the receiving portion 21 is slightly greater than the sum of an outer diameter R2 of the pipe 100 and a thickness t1 of the rubber cover 6 so that the pipe-end portion 110 with the rubber cover 6 attached thereto can be inserted.

In the present embodiment, as shown in FIGS. 1 and 5, the union nut 4 has a groove 41 which is provided on an outer-peripheral surface and to which hooks 72 of the retaining ring 7 are latched, an internal thread 42 formed on an inner-peripheral surface, and an annular flange 44 protruding from the groove 41. By screwing and tightening the union nut 4 to the receiving portion 21, the packing 3 is compressively deformed to ensure a waterproof state for the pipe fitting. An inner diameter R3 of an opening 43 of the union nut 4 is also slightly greater than the sum of the outer diameter R2 of the pipe 100 and the thickness t1 of the rubber cover 6 so that the pipe-end portion 110 with the rubber cover 6 attached thereto can be inserted.

As shown in FIG. 5, the corrosion-prevention core 5 has a tubular portion 51 covering the lining 103 on the inner-peripheral surface 102 of the pipe-end portion 110, and an annular brim 52 protruding outward from the tubular portion 51. A plurality of annular projections 53 are provided on the inner side of the tubular portion 51. The tubular portion 51 has an outer diameter slightly greater than the inner diameter of the pipe 100, so as to closely contact with the lining 103 on the inner-peripheral surface 102 of the pipe 100. As such a corrosion-prevention core 5, for example, a product as described in Japanese Laid-Open Patent Publication No. 2009-41638 can be used.

As shown in FIG. 5, the rubber cover 6 has a tubular portion 61 closely contacting with the outer-peripheral surface 101 of the pipe-end portion 110, and an annular rib 62 protruding from the tubular portion 61 toward the center. The thickness t1 of rubber of the tubular portion 61 is, for example, approximately equal to a thickness of an outer-surface coating of an inner-and-outer-surface-lined steel pipe, and is 1.0 to 1.5 mm, for example. In addition, the extension/contraction amount in an axial direction X of the tubular portion 61 is not greater than 1.0 mm, for example. A protrusion width W of the rib 62 is smaller than a thickness t2 of the pipe body 111, and an inner end 62a of the rib 62 is located on the outer-peripheral surface 101 side relative to an inner edge (inner-peripheral surface 102 side) of the pipe-end surface 112.

As shown in FIGS. 2 to 4, 6, 7, and 9, the first divisional component 70a of the retaining ring 7 has a body portion 71 along the outer-peripheral surface 101, arms 73 which are along the axial direction X of the pipe 100 and are provided with, at distal ends, the hooks 72 to be latched to the union nut 4, and protruding portions 74 provided with the arms 73 and protruding outward from end portions 71a of the body portion 71. The first divisional component 70a is left-right symmetric with respect to the center of the body portion 71.

On the back surface (pipe 100 side) of the body portion 71, teeth 71b protruding toward the pipe 100 side are provided near the protruding portions 74. A plurality of the teeth 71b are arranged at appropriate intervals in the width direction (the axial direction X of the pipe 100) of the body portion 71. In addition, the teeth 71b are provided line-symmetrically with respect to the center of the body portion 71.

Figure 9:
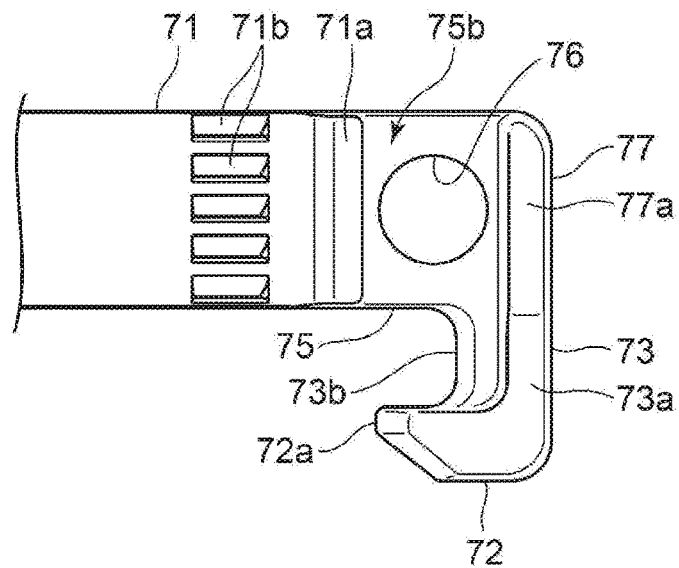
FIG. 9 is an enlarged plan view showing a part around a back surface of a flange portion of the first divisional component shown in FIG. 7.

Each protruding portion 74 has a flange portion 75 having a through hole 76 through which a bolt 9a of the tightening means 9 penetrates, and a wall portion 77 extending from the flange portion 75. In the present embodiment, the wall portion 77 is provided only at a side part (a radially outer end of the pipe 100) along the axial direction X of the flange portion 75. Then, as shown in FIG. 9, the back surface of the flange portion 75 is a flat surface 75b, and members corresponding to the wall portion 77 are not provided at both ends orthogonal to the axial direction X of the flat surface 75b of the flange portion 75. It is noted that, as shown in FIG. 4, a length L along the axial direction X of the wall portion 77 is equivalent to a length along the axial direction X of a compressively-deformable held member 8 (rubber member 80)).

Figure 4:
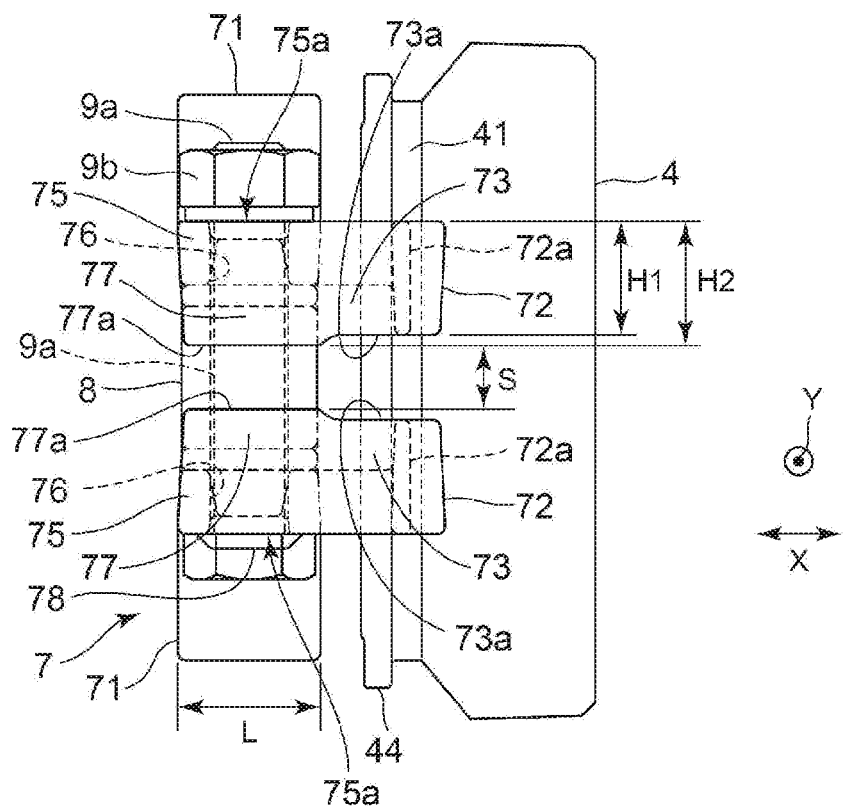
FIG. 4 is a side view of FIG. 2.

Here, as shown in FIG. 4, the hook 72 and the arm 73 are formed with the same height (thickness) H1 from a top surface 75a of the flange portion 75. Meanwhile, the wall portion 77 is formed with a height (thickness) H2 from the top surface 75a of the flange portion 75. That is, an end portion 77a of the wall portion 77 opposed to the other divisional component slightly protrudes toward the other divisional component relative to an end portion 73a of the arm 73 and the hook 72 opposed to the other divisional component (H1<H2).

As shown in FIGS. 2 to 4, 6, and 8, the second divisional component 70b of the retaining ring 7 has the same configuration as the first divisional component 70a. However, the second divisional component 70b is different from the first divisional component 70a in that ridges 78 for preventing rotation of the head of the bolt 9a are provided on the top surface 75a of each flange portion 75.

Figure 10:
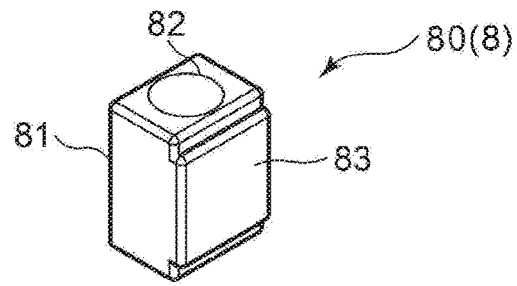
FIG. 10 is a perspective view showing a rubber member.

In addition, the retaining ring 7 has the compressively-deformable held members 8 through which the tightening means 9 are inserted and which are held between the flange portions 75 opposed to each other. In the present embodiment, as the compressively-deformable held members 8, the compressively-deformable rubber members 80 are used. As shown in FIG. 10, each rubber member 80 has a body portion 81 having a substantially rectangular shape, and a through hole 82 which penetrates through the body portion 81 and through which the bolt 9a of the tightening means 9) penetrates. The body portion 81 has a held portion 83 which protrudes outward from one side surface and is held between the end portions 71a of the body portions 71 opposed to each other.

Here, temporary assembling and installation of the pipe detachment preventing device 1 will be described.

First, the first and second divisional components 70a, 70b are opposed to each other and the rubber members 8 are placed between the flange portions 75 of the divisional components 70a, 70b. At this time, the held portion 83 of each rubber member 80 is held between the end portions 71a of the body portions 71. Further, the width of the body portion 81 is equivalent to the interval between the wall portion 77 and the end portion 71a of the body portion 71, and the body portion 81 contacts with the flat surface 75b of the flange portion 75 and is held between the end portion 71a and the wall portion 77. Thus, at the time of inserting the bolt 9a, the posture of the rubber member 8 can be stably kept between the flange portions 75 opposed to each other, whereby insertion of the bolt 9a is facilitated and workability improves.

Then, the arms 72 of the first and second divisional components 70a, 70b are fitted into the groove 41 of the union nut 4, the bolts 9a are inserted into the through holes 76 of the flange portions 75 and the through holes 82 of the rubber members 80, and nuts 9b are screwed to the bolts 9a. Thus, the retaining ring 7 is latched to the union nut 4 in a loose-fit state, so that the pipe detachment preventing device 1 comes into a temporarily-assembled state. By interposing the rubber members 80 between the flange portions 75 of the first and second divisional components 70a, 70b, it is possible to prevent a phenomenon in which the nut 9b comes off and the temporarily-assembled state of the pipe detachment preventing device 1 is released.

Figure 6:
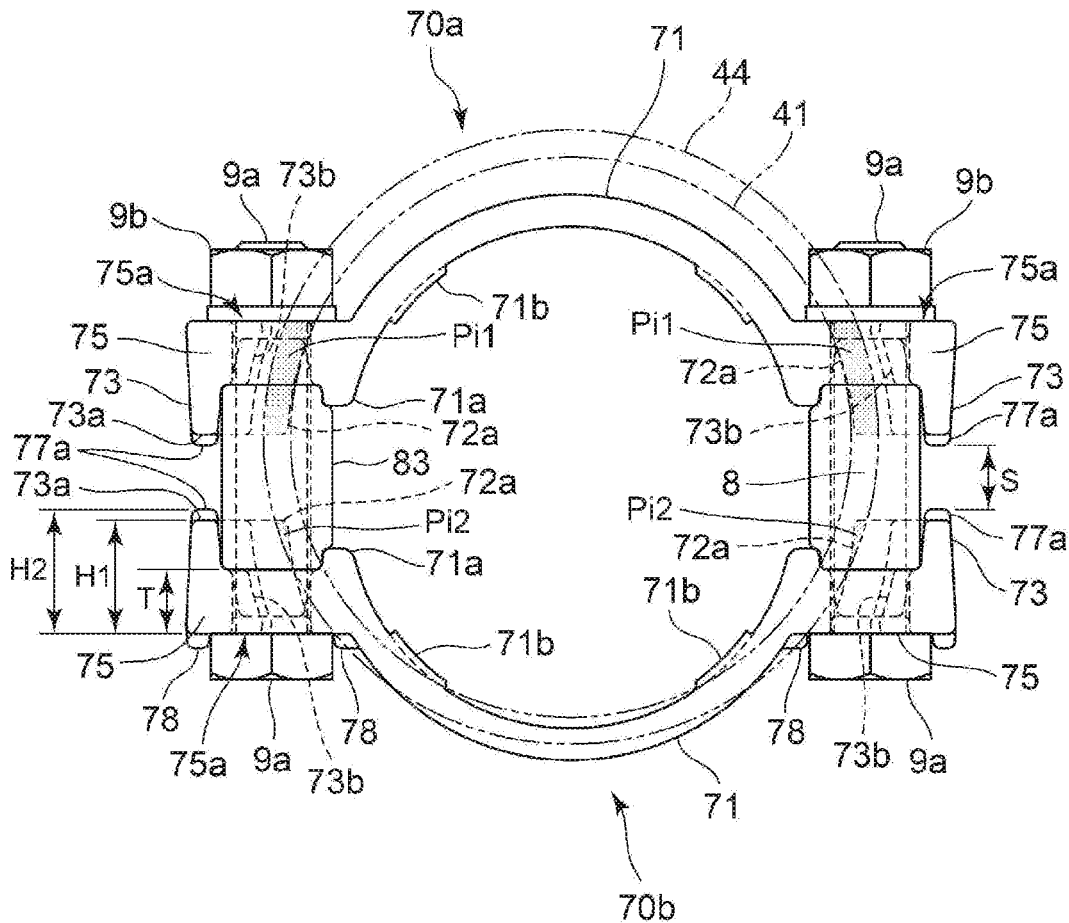
FIG. 6 is a view illustrating a latched state between a retaining ring and a pressing ring before pipe insertion.
Figure 7:
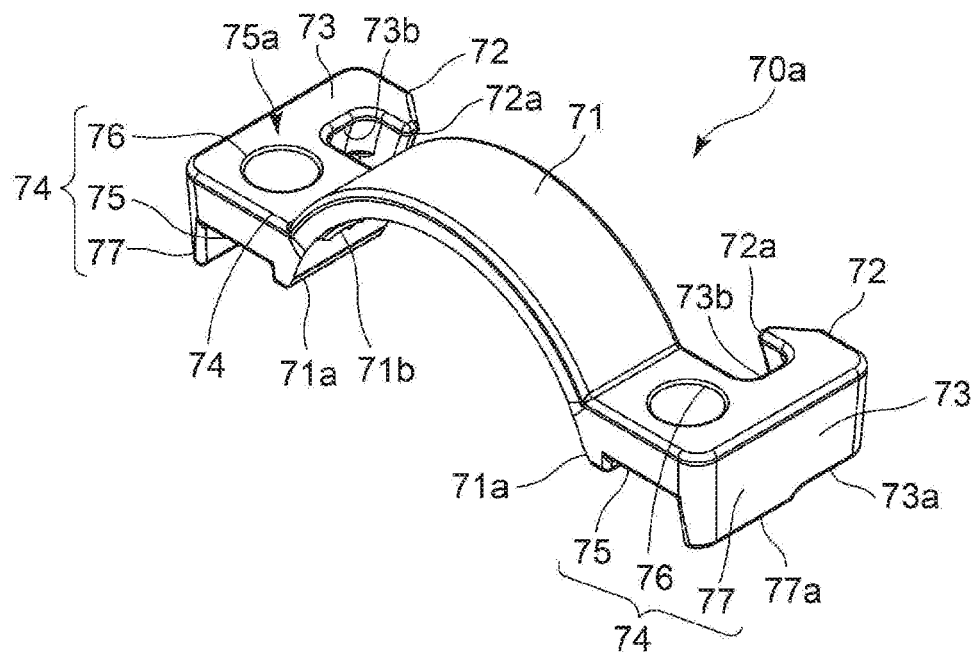
FIG. 7 is a perspective view showing a first divisional component.
Figure 8:
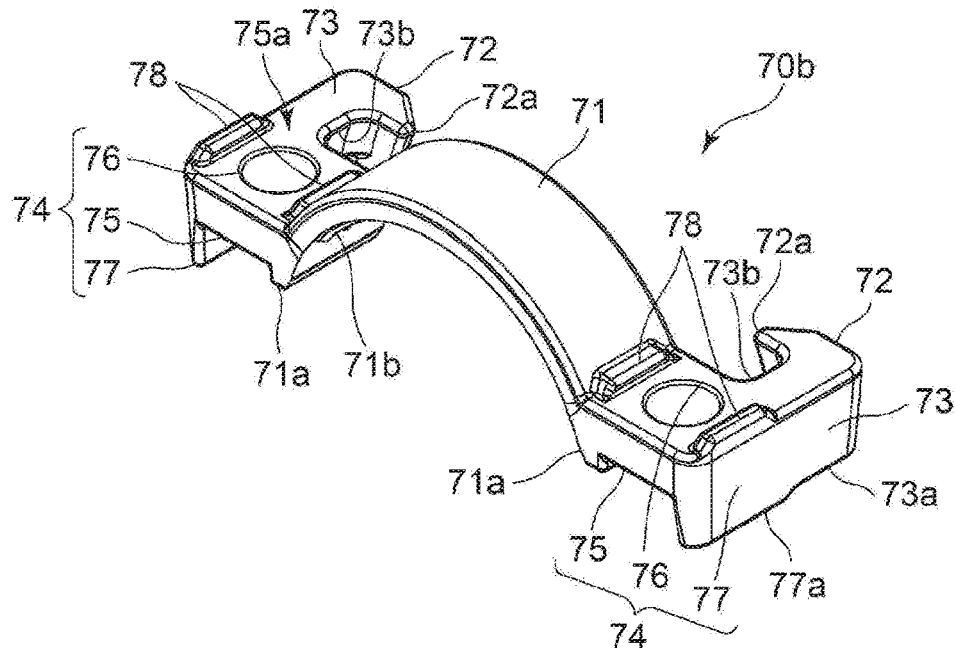
FIG. 8 is a perspective view showing a second divisional component.

In the loose-fit state (temporarily-assembled state), each rubber member 80 is slightly compressed by the flange portions 75 with the nut 9b tightened. In addition, as shown in FIGS. 4 and 6, a gap S is formed by the rubber member 80, between the wall portions 77 of the first and second divisional components 70a, 70b. By the rubber member 80, the first and second divisional components 70a, 70b opposed to each other are subjected to reaction forces so as to be separated from each other. Thus, at the time of inserting the pipe 100 into the fitting body 2, the first and second divisional components 70a, 70b do not come close to each other and the gap S is ensured (kept). Therefore, at the time of inserting the pipe 100, a worker need not hold the first and second divisional components 70a, 70b by a hand so as to prevent them from coming close to each other, and workability significantly improves. In addition, in the temporarily-assembled state of the pipe detachment preventing device 1, the inner diameter of the retaining ring 7 is kept greater than the outer diameter of the pipe 100 by the rubber members 80, whereby insertion of the pipe 100 is facilitated.

Further, as shown in FIG. 6, in a state before the pipe 100 is inserted, the first and second divisional components 70a, 70b coupled by the tightening means 9 are positioned (latched) so as to be shifted downward by gravity. In the present embodiment, since the rubber cover 61 is attached to the outer-peripheral surface 101 of the pipe 100 to be inserted, the teeth 71b and the outer-peripheral surface 101 are separated from each other. Therefore, if the height (thickness) H1 of the hook 72 and the arm 73 is low (thin), the retaining ring 7 might come off the union nut 4. Accordingly, for example, the height (thickness) H1 of the hook 72 and the arm 73 is set to be greater than a thickness T of the flange portion 75 (T<H1<H2). Thus, a distal end 72a of the hook 72 of the first divisional component 70a forms an interference portion Pi1 (hatched part in FIG. 6) that can interfere (contact) with the annular flange 44, and a part of a distal end 72a of the hook 72 of the second divisional component 70b also forms an interference portion Pi2 (hatched part in FIG. 6) that can interfere with the annular flange 44, whereby the retaining ring 7 can be prevented from coming off.

Figure 11:
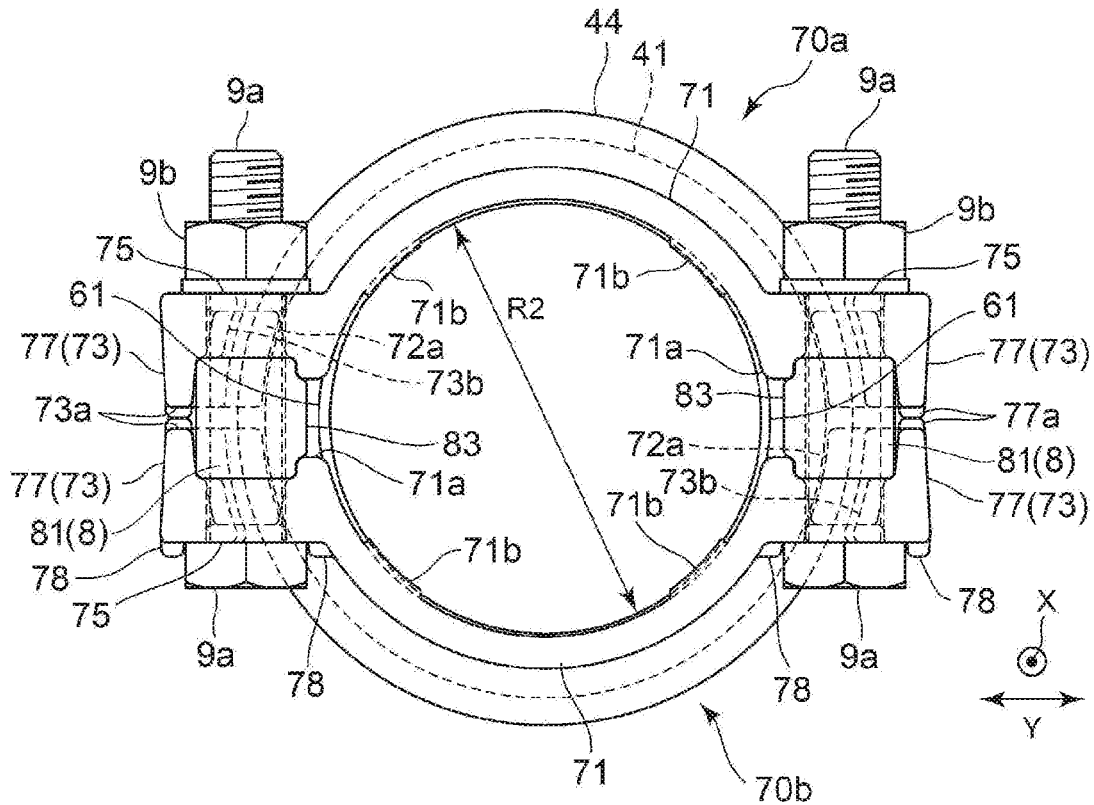
FIG. 11 is a view corresponding to FIG. 2 and showing a state after the retaining ring is tightened.
Figure 12:
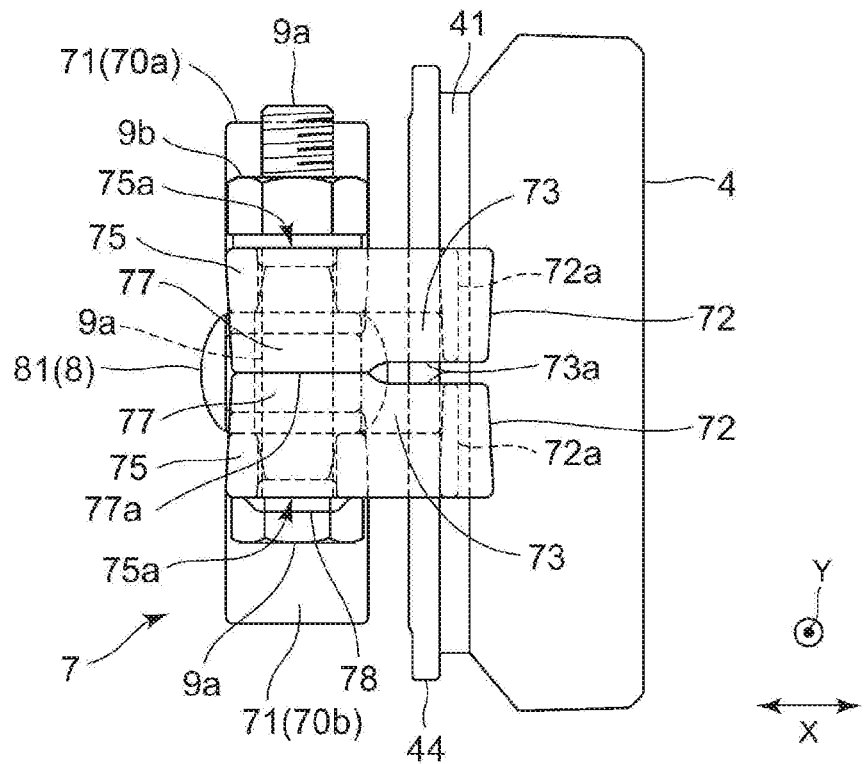
FIG. 12 is a view corresponding to FIG. 4 and showing a state after the retaining ring is tightened.

Then, the bolts 9a and the nuts 9b are tightened, whereby the retaining ring 7 is tightened and fixed to the pipe 100. At this time, the bolts 9a and the nuts 9b are tightened until the gaps S formed between the wall portions 77 disappear. As shown in FIGS. 11 and 12, the bolts 9a and the nuts 9b only have to be tightened until the distal ends 77a of the wall portions 77 come into contact with each other. Thus, completion of tightening work can be easily confirmed and variations in the tightening amount among workers can be reduced. Moreover, since the end portion 77a of the first divisional component 70a protrudes toward the second divisional component 70b relative to the end portion 73a of the arm 73 and the hook 72 of the first divisional component 70a (H1<H2), the end portions 73a of the arms 73 and the hooks 72 opposed to each other do not contact with each other when tightening work is completed.

In addition, when the tightening means 9 are tightened, as shown in FIG. 11, a center part of each body portion 71 is deformed so as to come close to the pipe 100 and the teeth 71b bite into the pipe 100. Thus, detachment of the pipe 100 is prevented. Here, each wall portion 77 is provided only at the side part (the radially outer end of the pipe 100) along the axial direction X of the flange portion 75. Thus, as shown in FIG. 12, the rubber member 80 is compressively deformed by the flange portions 75, and the compressive deformation is led in the axial direction X where the wall portions 77 are absent. Since two locations on both sides (front and rear sides) in the axial direction X of the flange portions 75 are opened, tightening torque does not become excessive and workability is not lowered. In addition, since a part of the compressively deformed body portion 81 protrudes out in the axial direction X from the flange portions 75 as shown in FIG. 12, the body portion 81 protruding out from the flange portions 75 can be visually recognized as seen in the axial direction of the bolt 9a in tightening work, whereby the tightening degree can be easily confirmed. Moreover, since the rubber member 80 is an elastically-deformable member, when the nut 9b is loosened, the restoration force of the rubber member 80 acts so as to separate the first and second divisional components 70a, 70b from each other, whereby the pipe 100 can be easily detached from the retaining ring 7. Thus, the pipe detachment preventing device 1 according to the present embodiment using the rubber member 80 is suitable also for re-installation.

Next, with reference to FIGS. 13 to 18, a second embodiment of the present invention will be described. In the following embodiment, members and the like similar to those in the above first embodiment are denoted by the same reference characters.

Figure 16:
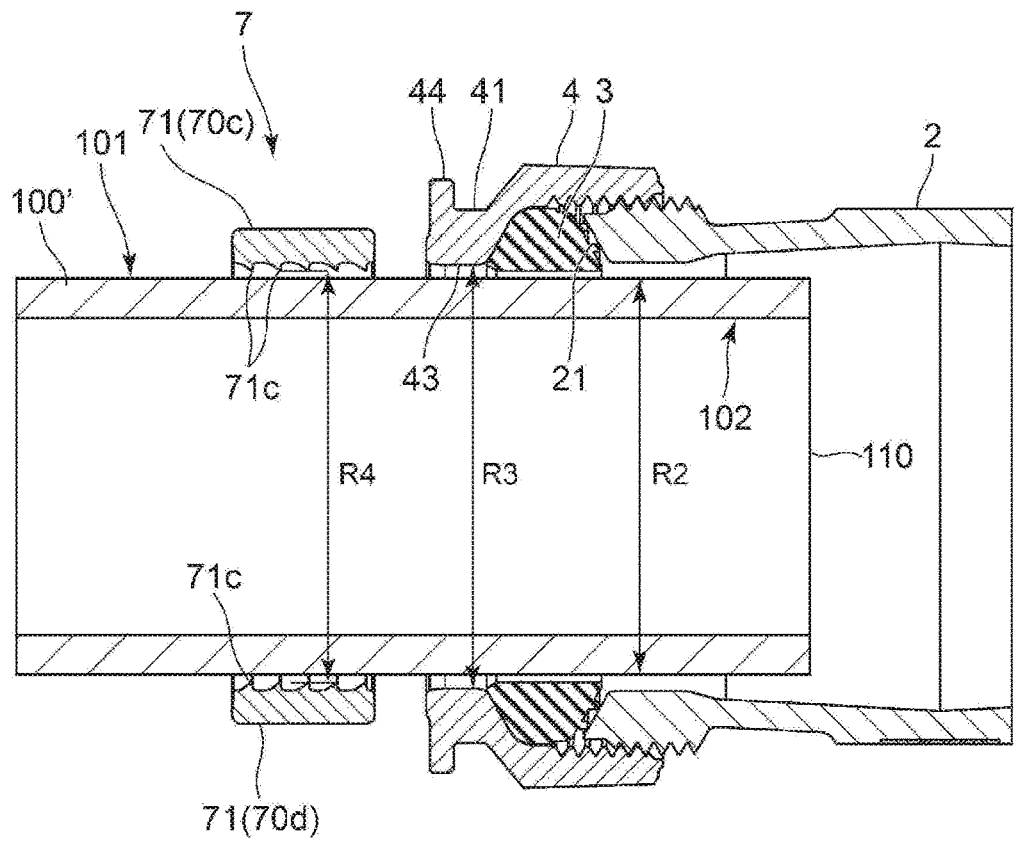
FIG. 16 is a view corresponding to FIG. 5, in the other embodiment of the present invention.

In the above first embodiment, the case where the pipe 100 is an inner-surface-lined steel pipe and has the corrosion-prevention core 5 and the rubber cover 6 attached to the pipe-end portion 110 has been described as an example. However, the pipe 100 is not limited to an inner-surface-lined steel pipe and may be an inner-and-outer-surface-coated pipe. Further, the pipe 100 is not limited to a steel pipe and may be a plastic pipe 100' such as a polyethylene pipe or a polyvinyl chloride pipe. In such a case, as shown in FIG. 16, the pipe 100' is not coated on the inner and outer surfaces, and the corrosion-prevention core 5 and the rubber cover 6 are not needed.

Figure 13:
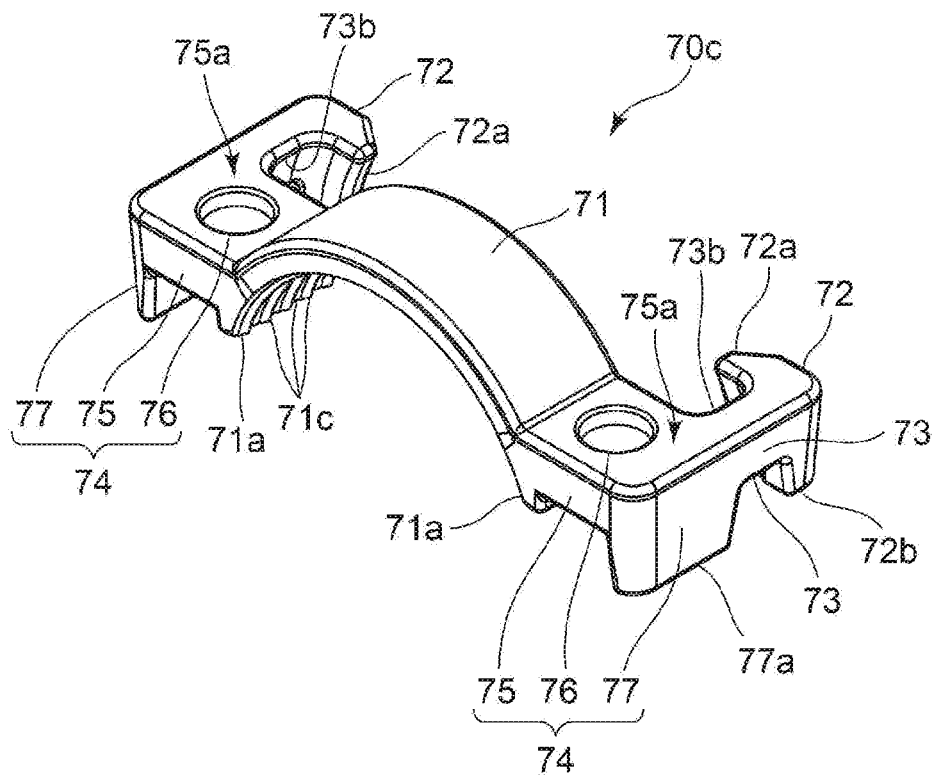
FIG. 13 is a perspective view showing a first divisional component in another embodiment of the present invention.
Figure 14:
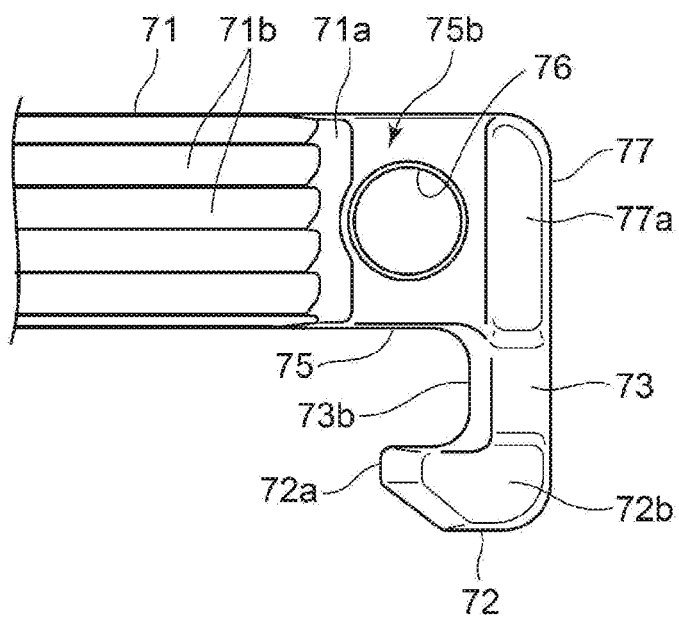
FIG. 14 is an enlarged plan view showing a part around a back surface of a flange portion of the first divisional component shown in FIG. 13.
Figure 15:
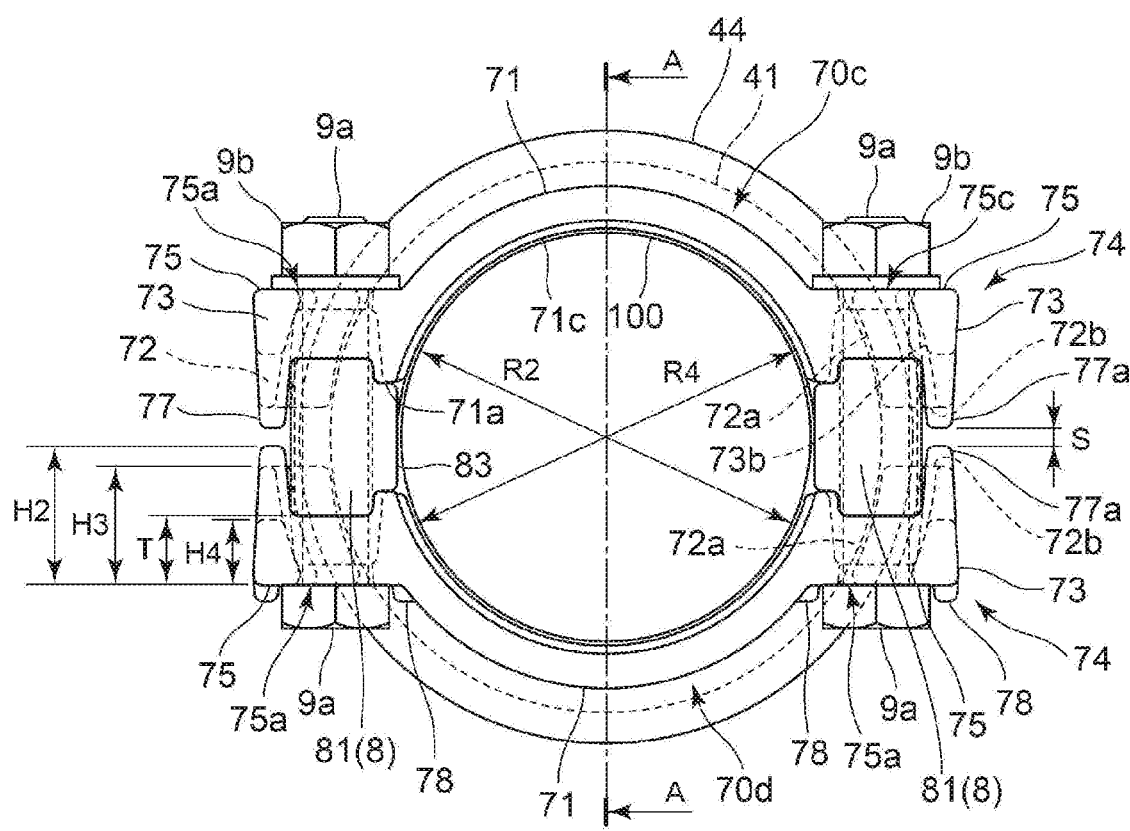
FIG. 15 is a view corresponding to FIG. 2, in the other embodiment of the present invention.

Since such a plastic pipe 100' has elasticity and flexibility, in order to prevent detachment of the pipe 100', a body portion 71 of each of first and second divisional components 70c, 70d has a plurality of arc teeth 71c along the circumferential direction over the entire back surface, as shown in FIGS. 13 to 15. The diameter of the retaining ring 7 is slightly reduced relative to the outer diameter of the pipe 100' so that the arc teeth 71c bite into the pipe 100", thereby improving a pipe detachment preventing force.

Also in the present embodiment, the retaining ring 7 has the rubber members 80 through which the tightening means 9 are inserted and which are held between the flange portions 75 opposed to each other. Then, in a temporarily-assembled state (loose-fit state) of the pipe detachment preventing device 1, each rubber member 80 is slightly compressed by the flange portions 75 opposed to each other. In addition, as shown in FIG. 15, a gap S is formed by the rubber member 80, between the end portions 77a of the wall portions 77 of the first and second divisional components 70c, 70d. Therefore, at the time of inserting the pipe 100', a worker need not hold the first and second divisional components 70c, 70d by a hand so as to prevent them from coming close to each other, and workability significantly improves. It is noted that the second divisional component 70d is different from the first divisional component 70c in that the ridges 78 are provided on the top surface 75a of each flange portion 75 but the other configurations are the same.

Figure 18:
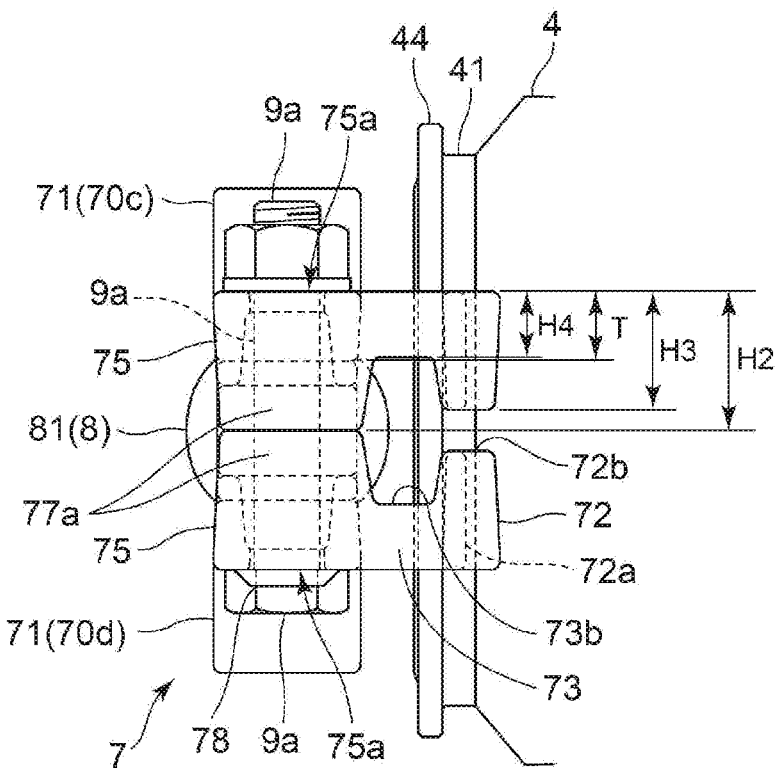
FIG. 18 is a view corresponding to FIG. 12, in the other embodiment of the present invention.
Figure 19:
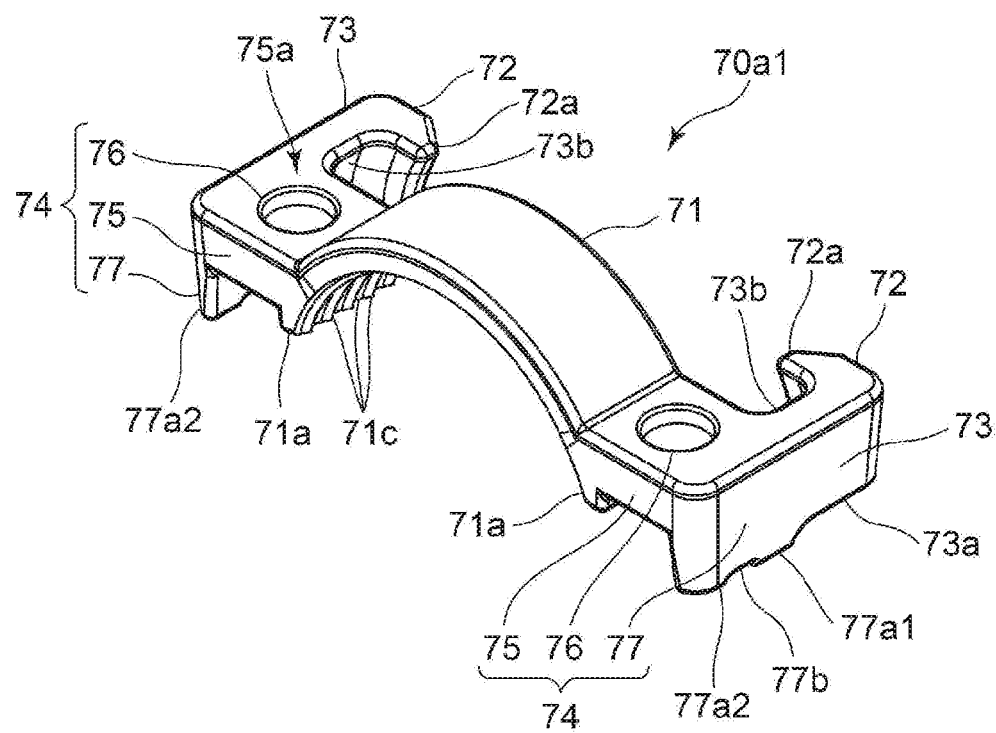
FIG. 19 is a perspective view showing a first divisional component in still another embodiment of the present invention.

In addition, the configurations of the protruding portions 74 (flange portions 75, through holes 76, and wall portions 77) are the same as those in the above first embodiment. Each wall portion 77 is provided only at the side part (the radially outer end of the pipe 100) along the axial direction X of the flange portion 75. Thus, as shown in FIG. 18, compressive deformation of the rubber member 80 by diameter reduction of the retaining ring 7 is led to two locations on both sides (front and rear sides) in the axial direction X of the flange portions 75 where the wall portions 77 are not provided. Therefore, tightening torque does not become excessive and workability is not lowered.

Here, as shown in FIGS. 15 and 18, a height (height/thickness from the top surface 75a of the flange portion 75) H3 of the hook 72 is greater than a height (height/thickness from the top surface 75a of the flange portion 75) H4 of the arm 73 (H4<H3). In addition, the height H4 of the arm 73 is approximately equal to the thickness T of the flange portion 75. Then, the height (height/thickness from the top surface 75a of the flange portion 75) H2 of the wall portion 77 is greater than the height H3 of the hook 72. That is, the end portion 77a of the wall portion 77 opposed to the other divisional component protrudes toward the other divisional component relative to an end portion 72b of the hook 72 opposed to the other divisional component (H4<H3<H2). Further, the height H3 of the hook 72 is greater than the thickness T of the flange portion 75 (T<H3<H2). Thus, even if the first and second divisional components 70c, 70d are positioned (latched) so as to be shifted downward by gravity, the distal ends 72a of the hooks 72 interfere (contact) with the annular flange 44, whereby the retaining ring 7 is prevented from coming off.

Figure 17:
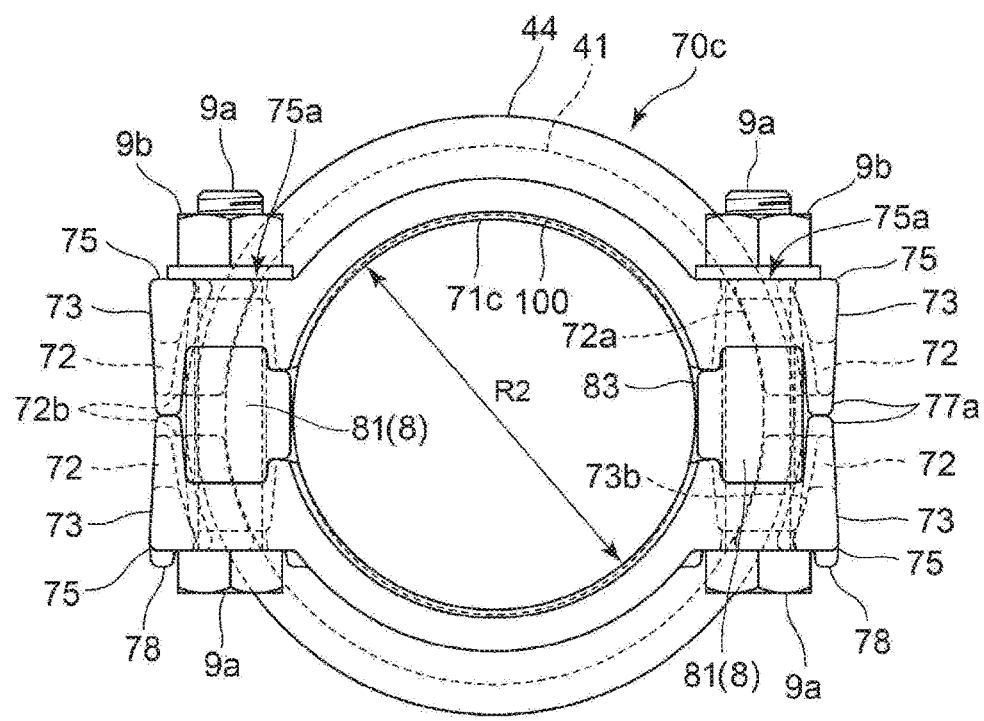
FIG. 17 is a view corresponding to FIG. 11, in the other embodiment of the present invention.

In addition, also in the present embodiment, the bolts 9a and the nuts 9b are tightened until the gaps S formed between the wall portions 77 disappear, whereby the retaining ring 7 is tightened and fixed to the pipe 100'. As shown in FIG. 17, the diameter of the pipe 100' is reduced by the body portions 71 of the first and second divisional components 70c, 70d, and the arc teeth 71c bite into the pipe 100'. Thus, detachment of the pipe 100' is prevented. At this time, as shown in FIG. 18, the bolts 9a and the nuts 9b only have to be tightened until the distal ends 77a of the wall portions 77 come into contact with each other. Thus, completion of tightening work can be easily confirmed and variations in the tightening amount among workers can be reduced. Moreover, since the end portion 77a of the first divisional component 70c protrudes toward the second divisional component 70d relative to the end portion 72b of the hook 72 of the first divisional component 70a (H4<H3), the end portions 72b of the hooks 72 opposed to each other do not contact with each other when tightening work is completed.

Finally, other possible embodiments will be described.

In the above embodiments, a distal-end surface of the end portion 77a of the wall portion 77 is formed to be a flat surface. However, the shape of the end portion 77a is not limited thereto. For example, as shown in FIG. 17, the wall portion 77 may have a recess 77b, to form paired end portions 77a1, 77a2. It suffices that tightening work can be managed using contact between the end portions 77a of the wall portions 77 and the end portions of the hooks 72 do not contact with each other.

In the above embodiments, the through hole 82 of the rubber member 80 has a circular shape in a plan view: but may have any shape as long as the bolt 9a can penetrate (be inserted) therethrough. For example, the shape of the through hole 82 may be a U shape in a plan shape. However, in a case of a U shape, both end portions of the U shape expand through compressive deformation so that the rubber member 80 might come off the flange portions 75. Therefore, as shown in the above embodiments, the through hole 82 having a circular shape is preferable.

Figure 20:
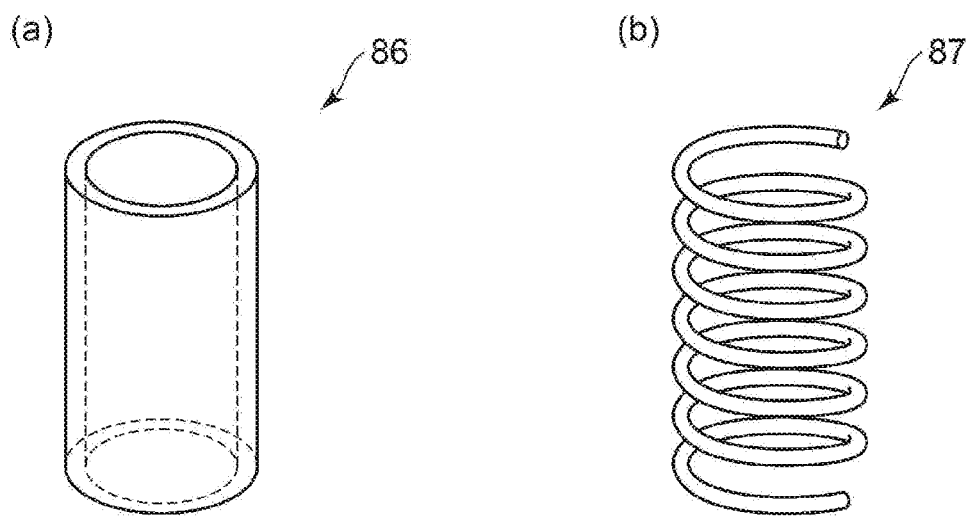
FIG. 20($a$) and FIG. 20($b$) are views showing a modification of a compressively-deformable held member.

In the above embodiments, as the compressively-deformable held member 8, the elastically-deformable rubber member 80 is used. However, the held member 8 is not limited thereto, and for example, a tubular member 86 made of a plastically-deformable material as shown in FIG. 20(a) may be used. The tubular member 86 is, for example, a cylindrical nylon tube, and provides effects equivalent to those in the above embodiments. However, since the tubular member 86 is plastically deformable, the rubber member 80 is more suitable for re-installment. It is noted that examples of the plastically-deformable material include polyurethane and polyolefin, as well as nylon, but any material may be used as long as the material is plastically deformable to such an extent that does not hamper tightening by the tightening means 9.

Further, instead of the rubber member 80, a helical compression spring 87 as shown in FIG. 20(b) may be used. The helical compression spring 87 is also an elastically-deformable member and therefore provides effects equivalent to those of the rubber member 80.

It is noted that, as shown in FIGS. 9 and 14, in a case where the interval between the wall portion 77 and the end portion 71a of the body portion 71 is shorter than the length along the axial direction X of the flat surface 75b on the back side of the flange portion 75 (the flat surface 75b is not square), the cylindrical member 86 can be attached in a state deformed in a substantially elliptic shape. In addition, each of the cylindrical member 86 and the helical compression spring 87 may be formed in a substantially elliptic shape as seen in the axial direction (in a plan view) in accordance with the shape of the flat surface 75b.

In addition, in the above embodiments, since the tightening direction (the axial direction of the bolt 9a) of the tightening means 9 substantially coincides with the vertical direction, the held member 8 can be stably held between the flat surfaces 75b of the flange portions 75 opposed to each other. However, for example, in a case where the tightening direction of the tightening means 9 substantially coincides with the horizontal direction, if each of the cylindrical member 86 and the helical compression spring 87 is formed in a substantially elliptic shape as described above, the posture of the held member 8 is kept by contact with the wall portion 77 or the end portion 71*a* of the body portion 71, whereby insertion of the bolt 9*a* is facilitated.

As described above, for the compressively-deformable held member 8, either an elastically-deformable material or a plastically-deformable material can be used as long as the material is deformable to such an extent that does not hamper tightening by the tightening means 9. In addition, the plan-view shape of the compressively-deformable held member 8 is not limited to a circular shape or an elliptic shape.

DESCRIPTION OF THE REFERENCE CHARACTERS 1 pipe detachment preventing device
2 fitting body
3 packing
4 union nut
5 corrosion-prevention core
6 rubber cover
7 retaining ring
8 compressively-deformable held member
9 tightening means
9*a* bolt
9*b* nut
10 union nut pipe fitting
21 receiving portion
22 external thread
41 groove
42 internal thread
43 opening
44 annular flange
51 tubular portion
52 brim
53 annular projection
61 tubular portion
61*a* end portion
61*b* distal end
62 rib
62*a* inner end
63 opening
70*a*, 70*c* first divisional component
70*b*, 70*d* second divisional component
71 body portion
71*a* end portion
71*b* tooth
71*c* arc tooth
72 hook
72*a* distal end
72*b* end portion
73 arm
73*a* end portion
73*b* inner surface
74 protruding portion
75 flange portion
75*a* top surface
75*b* flat surface (back surface)
76 through hole
77 wall portion
77*a*, 77*a*1, 77*a*2 end portion
78 ridge
80 rubber member
81 body portion
82 through hole
83 held portion
86 cylindrical member
87 helical compression spring
100 pipe (inner-surface-lined steel pipe)
100' pipe (plastic pipe)
101 outer-peripheral surface
102 inner-peripheral surface
103 lining
110 pipe-end portion
111 pipe body
112 pipe-end surface
113 exposed portion
C cut portion
H1 height (thickness) of hook and arm
H2 height (thickness) of wall portion
H3 height of hook
H4 height of arm
R1 inner diameter of receiving portion
R2 outer diameter of pipe
R3 inner diameter of opening
R4 inner diameter of tooth tip
R5 outer diameter of rubber cover
T thickness of flange portion
t1 thickness of tubular portion
t2 thickness of pipe body
S gap
Pi1, Pi2 interference portion
X axial direction
Y orthogonal direction
W protrusion width

The invention claimed is:

1. A pipe detachment preventing device for a union nut pipe fitting, comprising:
a fitting body having a receiving portion which has an external thread on an outer surface thereof and into which a non-threaded pipe is inserted;
a union nut which is screwed and tightened to the receiving portion with an annular rubber packing interposed therebetween; and
a retaining ring composed of a pair of divisional components fixed to an outer-peripheral surface of the pipe by tightening means so as to be opposed to each other, wherein
each divisional component includes
a body portion along the outer-peripheral surface,
an arm which is along an axial direction of the pipe and is provided with, at a distal end, a hook to be latched to the union nut, and
a protruding portion provided with the arm and protruding outward from an end portion of the body portion,
the protruding portion has at least a flange portion having a through hole through which the tightening means penetrates, and a wall portion extending from the flange portion,
the wall portion is provided only at a side part along the axial direction of the flange,
an end portion of the wall portion opposed to another divisional component is formed so as to protrude toward the other divisional component relative to end portions of the arm and the hook opposed to the other divisional component,
when the end portions of the wall portions are brought into contact with each other, the end portions of the arms and the hooks do not contact with each other, the retaining ring has an elastically-deformable rubber member through which the tightening means is inserted and which is held between the flange portions opposed to each other, the rubber member forms a gap between the end portions of the wall portions when the pair of divisional components are coupled by the tightening means and latched to the union nut in a loose-fit state, and the tightening means is tightened until the end portions of the wall portions are brought into contact with each other and the gap disappears, thus causing a part of the rubber member to protrude out in the axial direction from the flange portion and tightening and fixing the pair of divisional components to the outer-peripheral surface of the pipe, wherein the end portion of the body portion of each divisional component protrudes from the flange portion, and the rubber member has a second body portion with a substantially rectangular shape, and a protruding portion which protrudes toward a pipe-axis side from a side surface of the body portion located on the pipe-axis side, and the protruding portion is held between the end portions of the body portions of the divisional components opposed to each other.

2. The pipe detachment preventing device for a union nut pipe fitting according to claim 1, wherein
a height of the hook from a top surface of the flange portion is greater than a thickness of the flange portion.

3. The pipe detachment preventing device for a union nut pipe fitting according to claim 2, wherein
a height of the arm from the top surface of the flange portion is equal to or smaller than the height of the hook from the top surface of the flange portion.

4. The pipe detachment preventing device for a union nut pipe fitting according to claim 1, wherein
the second body portion of the rubber member is held between the wall portion and a part protruding from the flange portion of the body portion of each divisional component.

5. The pipe detachment preventing device for a union nut pipe fitting according to claim 1, wherein
the rubber member has a through hole through which the tightening means penetrates and which has a circular shape.

6. The pipe detachment preventing device for a union nut pipe fitting according to claim 1, wherein
the pipe is an inner-surface-lined steel pipe or an inner-and-outer-surface-lined steel pipe, and on an inner surface of the body portion, a tooth is formed adjacent to the protruding portion.

7. The pipe detachment preventing device for a union nut pipe fitting according to claim 1, wherein
the pipe is a plastic pipe, and on an inner surface of the body portion, a plurality of teeth are formed along a circumferential direction of the pipe.

* * * * *